United States Patent
Peiffer et al.

(10) Patent No.: US 7,288,312 B2
(45) Date of Patent: Oct. 30, 2007

(54) COEXTRUDED, HOT-SEALABLE AND PEELABLE POLYESTER FILM HAVING LOW PEELING RESISTANCE, PROCESS FOR ITS PRODUCTION AND ITS USE

(75) Inventors: Herbert Peiffer, Mainz (DE); Gottfried Hilkert, Saulheim (DE); Cynthia Bennett, Alzey (DE); Andreas Stopp, Ingelheim (DE)

(73) Assignee: Mitsubishi Polyester Film GmbH, Weisbaden (DE)

( * ) Notice: Subject to any disclaimer, the term of this patent is extended or adjusted under 35 U.S.C. 154(b) by 427 days.

(21) Appl. No.: 10/953,664

(22) Filed: Sep. 29, 2004

(65) Prior Publication Data

US 2005/0074598 A1    Apr. 7, 2005

Related U.S. Application Data

(63) Continuation-in-part of application No. 10/645,102, filed on Aug. 21, 2003, now abandoned.

(30) Foreign Application Priority Data

Apr. 22, 2003 (DE) ................................ 103 18 098

(51) Int. Cl.
*B32B 7/02* (2006.01)
(52) U.S. Cl. ........................ 428/212; 428/213; 428/220
(58) Field of Classification Search ................ 428/212, 428/213, 220
See application file for complete search history.

(56) References Cited

U.S. PATENT DOCUMENTS

| | | | | |
|---|---|---|---|---|
| 4,375,494 A | * | 3/1983 | Stokes | ........................ 428/323 |
| 4,765,999 A | * | 8/1988 | Winter | ........................ 426/113 |
| 6,939,584 B2 | * | 9/2005 | Sankey et al. | ............ 427/393.5 |
| 2002/0071945 A1 | * | 6/2002 | Peiffer et al. | ................ 428/220 |
| 2005/0100718 A1 | * | 5/2005 | Peiffer et al. | ................ 428/200 |

FOREIGN PATENT DOCUMENTS

DE    109 224    11/1974

(Continued)

OTHER PUBLICATIONS

Schmitz, Peter et al., "Films" Ullmann's Encyclopedia of Industrial Chemistry, 5th Ed., vol. A11 (1988), pp. 85-110.*

*Primary Examiner*—Milton I. Cano
*Assistant Examiner*—David J. Joy
(74) *Attorney, Agent, or Firm*—ProPat, L.L.C.

(57) ABSTRACT

The invention more particularly relates to a coextruded, transparent, biaxially oriented polyester film comprising a base layer (B) and a heatsealable top layer (A) which is peelable from at least APET, the heatsealable and peelable top layer (A) consisting of
  a) 80-98% by weight of polyester and
  b) 2-10% by weight of inorganic and/or organic particles having an average diameter $d_{50}$ of from 2.0 to 8.0 μm (based on the mass of the top layer (A)),
wherein
  c) the polyester being composed of 30-95 mol % of units which derive from at least one aromatic dicarboxylic acid and 5-70 mol % of units which derive from at least one aliphatic dicarboxylic acid,
  d) the ratio of particle size $d_{50}$ and layer thickness $d_A$ of the top layer (A) being greater than 1.3 and
  e) the layer thickness of the top layer (A) $d_A$ being from 0.5 to 2.5 μm.

20 Claims, 3 Drawing Sheets

| | FOREIGN PATENT DOCUMENTS | | |
|---|---|---|---|
| DE | 237 070 A3 | 7/1986 |
| EP | 0 035 835 A1 | 9/1981 |
| EP | 0 156 464 A1 | 10/1985 |
| EP | 0 283 164 A2 | 9/1988 |
| EP | 0 379 190 A2 | 7/1990 |
| EP | 0 407 870 A2 | 1/1991 |
| EP | 0 485 893 A1 | 5/1992 |
| EP | 0 503 422 A1 | 9/1992 |
| EP | 1 068 949 A1 | 1/2001 |
| EP | 1 132 418 A1 | 9/2001 |
| EP | 1 471 094 A1 | 10/2004 |
| EP | 1 471 096 A1 | 10/2004 |
| EP | 1 471 097 A1 | 10/2004 |
| EP | 1 471 098 A1 | 10/2004 |
| EP | 1 475 228 A2 | 11/2004 |
| JP | 05-009319 A | 1/1993 |
| WO | WO 93/00403 A1 | 1/1993 |
| WO | WO 96/19333 A1 | 6/1996 |
| WO | WO 02/059186 A1 | 8/2002 |

\* cited by examiner

COEXTRUDED, HOT-SEALABLE AND PEELABLE POLYESTER FILM HAVING LOW PEELING RESISTANCE, PROCESS FOR ITS PRODUCTION AND ITS USE

CROSS REFERENCE TO RELATED APPLICATIONS

This application is a continuation-in-part of U.S. application Ser. No. 10/645,102 filed Aug. 21, 2003, now abandoned hereby incorporated by reference herein in it's entirety. This application further claims priority through its parent application to German Patent Application 103 18 098.2, filed Apr. 22, 2003, also hereby incorporated by reference herein in its entirety.

FIELD OF THE INVENTION

The invention relates to a coextruded, peelable, transparent and biaxially oriented polyester film having a base layer (B) and at least one top layer (A) applied to this base layer (B). The top layer (A) is heatsealable and features easy peelability (easy peel, in particular to APET/CPET trays (APET=amorphous poly-ethylene terephthalate (PET); CPET=crystalline PET)). The heatsealable and peelable top layer (A) comprises polyester based on aromatic and aliphatic acids and aliphatic diols. In addition, the top layer (A) comprises particles in a certain concentration and size. The invention further relates to a process for producing the film and to its use.

BACKGROUND OF THE INVENTION

For ready-prepared meals, there are currently double-figure growth rates in Europe. The ready-prepared meals are transferred to trays after their preparation (cf. FIG. 1). A film which is heatsealed to the edge of the tray seals the packaging and protects the ready-prepared meal from external influences. The ready-prepared meals are suitable, for example, for heating in a microwave, for heating in a conventional oven or for heating in a microwave and in a conventional oven. In the latter case, the ready-prepared meal and the packaging have to be "dual ovenable" (=suitable for microwave and conventional ovens). As a consequence of the temperatures existing in the conventional oven (up to 220° C.), particularly high demands are made on the packaging material (tray and lid film).

Both for the tray and for the lid film, only selected materials can be considered for dual ovenable applications. Typical materials for the trays are in this case CPET, aluminum, cardboard coated with PET or with PET film or APET/CPET trays. APET/CPET trays (cf. FIG. 1) consist externally of a CPET layer and internally of an APET layer. The thick crystalline CPET layer which is usually pigmented, i.e. filled with particles, provides the stability of the tray, even at the comparatively high temperatures in the conventional oven. In contrast, the amorphous PET essentially improves the adhesion of the film to the tray.

In dual ovenable applications, the material used for the lid film is generally PET which is sufficiently dimensionally stable and solid even at 220° C. Materials such as PP or PE are ruled out from the outset because of their low melting points. The requirements on the lid film are best fulfilled by biaxially oriented polyester film.

When preparing the ready-prepared meal in the oven, the polyester film is removed by hand from the tray shortly before heating or shortly after heating. When this is done, the polyester film must on no account start to tear or start and continue to tear. The removal of the film from the tray without the film starting or continuing to tear is also referred to in the foods industry as peeling. For this application, the polyester film therefore has to be not only heatsealable, but in particular also peelable. For a given material and given overall thickness of the film, the peelability of the film is determined mainly by the properties of the surface layer of the film which is sealed to the tray.

The peelability of films can be determined relatively simply in the laboratory using a tensile strain tester (for example Zwick) (cf. FIG. 2). For this test, two strips of breadth 15 mm and length approx. 50 mm are first cut out of the polyester film and the tray and sealed together. The sealed strips are, as shown in the figure, clamped into the clips of the tester. The "angle" between the film clamped in the upper clip and the tray strip is 180°. In this test, the clips of the tester are moved apart at a speed of 200 mm/min, and in the most favorable case, the film is fully removed from the tray (based on ASTM-D 3330).

In this test, a distinction is to be drawn between essentially two different mechanisms.

In the first case, the tensile force rises rapidly in the course of the pulling procedure up to a maximum (cf. FIG. 3a) and then falls directly back to zero. When the maximum force is attained, the film starts to tear, or, before delamination from the tray, tears off, resulting in the force falling immediately back to zero. The film is in this case not peelable, since it is destroyed. The behavior of the film can rather be described as a kind of "welding" to the tray. The destruction of the film on removal from the tray is undesired, because this complicates the easy opening of the packaging without tools such as scissors or knives.

In contrast, a peelable film is obtained when the tensile force or the peeling force rises up to a certain value (i.e. up to a certain plateau) and then remains approximately constant over the distance over which the two strips are sealed together (cf. FIG. 3b). In this case, the film does not start to tear, but rather can be peeled off as desired from the tray with a low force input.

The size of the peeling force is determined primarily by the polymers used in the sealing layer (A) (cf. FIG. 4, polymer 1 and polymer 2). In addition, the size of the peeling force is dependent in particular on the heatsealing temperature employed. The peeling force generally rises with the heatsealing temperature. With increasing heatsealing temperature, the risk increases that the sealing layer might lose its peelability. In other words, a film which is peelable when a low heatsealing temperature is employed loses this property when a sufficiently high heatsealing temperature is employed. This behavior is to be expected in particular in the case of polymers which exhibit the characteristics shown in FIG. 4 for polymer 1. This behavior which tends to generally occur but is rather unfavorable for the application has to be taken into account when designing the sealing layer. It has to be possible to heatseal the film in a sufficiently large temperature range without the desired peelability being lost (cf. polymer 2 in FIG. 4). In practice, this temperature range is generally from 150 to 220° C., preferably from 150 to 200° C. and more preferably from 150 to 190° C.

The heatsealable and peelable layer is applied to the polyester film in accordance with the prior art, generally by means of offline methods (i.e. in an additional process step following the film production). This method initially produces a "standard polyester film" by a customary process. The polyester film produced in this way is then coated in a further processing step in a coating unit offline with a heatsealable and peelable layer.

In this process, the heatsealable and peelable polymer is initially dissolved in an organic solvent. The final solution is then applied to the film by a suitable application process (knifecoater, patterned roller, die). In a downstream drying oven, the solvent is evaporated and the peelable polymer remains on the film as a solid layer.

Such an offline application of the sealing layer is comparatively expensive for several reasons. First, the film has to be coated in a separate step in a special apparatus. Second, the evaporated solvent has to be condensed again and recycled, in order thus to minimize pollution of the environment via the waste air. Third, complicated control is required to ensure that the residual solvent content in the coating is very low.

Moreover, in an economic process, the solvent can never be completely removed from the coating during the drying, in particular because the drying procedure cannot be of unlimited duration. Traces of the solvent remaining in the coating subsequently migrate via the film disposed on the tray into the foods where they can distort the taste or even damage the health of the consumer.

Various peelable, heatsealable polyester films which have been produced offline are offered on the market. The polyester films differ in their structure and in the composition of the top layer (A). Depending on their (peeling) properties, they have different applications. It is customary, for example, to divide the films from the application viewpoint into films having easy peelability (easy peel), having medium peelability (medium peel) and having strong, robust peelability (strong peel). The essential quantifiable distinguishing feature between these films is the size of the particular peeling force according to FIG. 3b. A division is carried out at this point as follows:

| Easy peelability (easy peel) | Peeling force in the range of from about 1 to 4 N per 15 mm of strip breadth |
| --- | --- |
| Medium peelability (medium peel) | Peeling force in the range from about 3 to 8 N per 15 mm of strip breadth |
| Strong, robust peelability (strong peel) | Peeling force in the range of more than 5 N per 15 mm of strip breadth |

Some sealable PET films are already known.

EP-A-0 035 835 describes a coextruded sealable polyester film to which particles whose average particle size exceeds the layer thickness of the sealing layer are added in the sealing layer to improve the winding and processing performance. The polymer of the sealing film layer is substantially a polyester copolymer which is based on aromatic dicarboxylic acids and also aliphatic diols. The particulate additives form surface elevations which prevent undesired blocking and adhesion of the film to rolls or guides. The selection of particles having a diameter greater than the sealing layer worsens the sealing performance of the film. No information is given in the document on the sealing temperature range of the film. The seal seam strength is measured at 140° C. and is in the range from 63 to 120 N/m (corresponding to from 0.97 to 1.8 N/15 mm of film breadth). There are no indications in the document concerning the peeling performance of the film with respect to trays made of APET, CPET and APET/CPET.

EP-A-0 379 190 describes a coextruded, biaxially oriented polyester film which comprises a carrier film layer made of polyester and at least one sealing film layer made of a polyester composition. The sealing film layer may comprise aliphatic and aromatic dicarboxylic acids and also aliphatic diols. The polymer for the sealing film layer comprises two different polyesters A and B, of which at least one (polyester B) contains aliphatic dicarboxylic acids and/or aliphatic diols. The sealing energy which is measured between two sealing film layers facing each other and joined together (=fin sealing) is more than 400 $g_{force}$·cm/15 mm (more than 4 N ·cm/15 mm), and the sealing film layer may comprise inorganic and/or organic fine particles which are insoluble in the polyester, in which case the fine particles are present in an amount of from 0.1 to 5% by weight, based on the total weight of the sealing film layer. In the examples of EP-A-0 379 190, organic particles, when they are used at all, are used in maximum amounts of 0.3% by weight. Although the film features good peeling properties (having plateau character in the peeling diagram [see above]) with respect to itself (i.e. sealing film layer with respect to sealing film layer), there is no information about the peeling performance with respect to trays made of APET, CPET and APET/CPET. In particular, the film of this invention is in need of improvement in its producibility and its processability (the raw materials tend to adhere).

WO A-96/19333 describes a process for producing peelable films, in which the heatsealable, peelable layer is applied inline to the polyester film. In the process, comparatively small amounts of organic solvents are used. The heatsealable, peelable layer comprises a copolyester for which a) from 40 to 90 mol % of an aromatic dicarboxylic acid, b) from 10 to 60 mol % of an aliphatic dicarboxylic acid, c) from 0.1 to 10 mol % of a dicarboxylic acid containing a free acid group or a salt thereof, d) from 40 to 90 mol % of a glycol containing from 2 to 12 carbon atoms and e) from 10 to 60 mol % of a polyalkyldiol for forming the copolyester were used. The coating is applied to the film from an aqueous dispersion or a solution which contains up to 10% by weight of organic solvent. The process is restricted with regard to the polymers which can be used and the layer thicknesses which can be achieved for the heatsealable, peelable layer. The maximum achievable layer thickness is specified as 0.5 µm. The maximum seal seam strength is low, and is from 500 to 600 g/25 mm², or [(from 500 to 600)/170] N/15 mm of film breadth.

WO 02/059186 A1 describes a process for producing peelable films, in which the heatsealable, peelable layer is likewise applied inline to the polyester film. In this case, melt-coating is employed, and it is preferably the longitudinally stretched film which is coated with the heatsealable, peelable polymer. The heatsealable, peelable polymer contains polyesters based on aromatic and aliphatic acids, and also based on aliphatic diols. The copolymers disclosed in the examples have glass transition temperatures of below −10° C.; such copolyesters are too soft, which is why they cannot be oriented in customary roll stretching methods (adhesion to the rolls). The thickness of the heat-sealable, peelable layer is less than 8 µm. In WO 02/059186 A1, the melt-coating known per se is delimited from the extrusion coating known per se technically and by the viscosity of the melt. A disadvantage of the process is that only comparatively fluid polymers (maximum 50 Pa*sec) having a low molecular weight can be used. This results in disadvantageous peeling properties of the film. Moreover, the coating rate in this process is limited, which makes the production process uneconomic. With regard to quality, faults are observed in the optical properties of the film which are visible, for example, as coating streaks. In this process, it is also difficult to obtain a uniform thickness of the sealing layer over the web breadth of the film, which in turn leads to nonuniform peeling characteristics.

SUMMARY OF THE INVENTION

It is an object of the present invention to provide a coextruded, heatsealable and peelable, biaxially oriented polyester film which features outstanding peeling properties with respect to trays, in particular with respect to the APET side of trays made of APET/CPET. It should no longer have the disadvantages of the prior art films and should in particular have the following features:

- Easy peelability (easy peel) with respect to the APET side of trays made of APET/CPET. The peeling force should be in the range from 1 to 4 N per 15 mm, preferably in the range from 1.5 to 4 N per 15 mm and more preferably in the range from 2.0 to 4 N per 15 mm, of film strip breadth.
- No organic solvent residues are present in the heatsealable and peelable layer.
- The heatsealable and peelable layer, with respect to the APET side of APET/CPET trays, has a minimum sealing temperature of 150° C., preferably 145° C., in particular 140° C., and a maximum sealing temperature of generally 220° C., preferably 200° C. and more preferably 190° C.
- It is produced employing processes in which no organic solvents are used from the outset.
- The film can be prepared economically. This also means, for example, that stretching processes which are customary in the industry can be used to produce the film. In addition, it should be possible to produce the film at machine speeds of up to 500 m/min which are customary today.
- Good adhesion (greater than 2 N/15 mm of film breadth) between the individual layers of the film is ensured for their practical employment.
- The optical properties of the film are good. This means, for example, low opacity (less than 20%) and high gloss (greater than 70 for the sealable side and >100 for the side opposite the sealable side, each at 20° angle of incidence) of the film
- In the course of the production of the film, it is guaranteed that the regrind can be fed back to the extrusion in an amount of up to 60% by weight, without significantly adversely affecting the physical (the tensile strength of the film in both directions should not decrease by more than 10%), but in particular the optical, properties of the film.

In addition, care should be taken that the film can be processed on high-speed machines. On the other hand, the known properties which distinguish polyester films should not deteriorate at the same time. These include, for example, the mechanical (the modulus of elasticity of the biaxially stretched films in both orientation directions should be greater than 3000 N/mm$^2$, preferably greater than 3500 N/mm$^2$ and more preferably greater than 4000 N/mm$^2$) and the thermal properties (the shrinking of the biaxially stretched films in both orientation directions should not be greater than 3%, preferably not greater than 2.8% and more preferably not greater than 2.5%), the winding performance and the processability of the film, in particular in the printing, laminating or in the coating of the film with metallic or ceramic materials.

In this context, heatsealable refers to the property of a coextruded polyester film which comprises at least one layer (=heatsealable top layer) which can be bonded by means of sealing jaws by applying heat (140 to 220° C.) and pressure (2 to 5 bar) within a certain time (0.2 to 2 sec) to itself (fin sealing), or to a substrate made of a thermoplastic (=lab sealing, in this case in particular the APET side of APET/CPET trays), without the carrier layer (=base layer) itself becoming plastic. In order to accomplish this, the polymer of the sealing layer generally has a distinctly lower melting point than the polymer of the base layer. When the polymer used for the base layer is, for example, polyethylene terephthalate having a melting point of 254° C., the melting point of the heatsealable layer is generally less than 230° C., in the present case preferably less than 210° C. and more preferably less than 190° C.

In this context, peelable refers to the property of a coextruded polyester film which comprises at least one layer (=heatsealable and peelable top layer) which, after heatsealing to a substrate (in this case substantially the APET side of an APET/CPET tray), can be pulled from the substrate in such a way that the film neither starts to tear nor tears off. The bond of hot-sealable film and substrate breaks in the seam between the heatsealed layer and substrate surface when the film is removed from the substrate (cf. also Ahlhaus, O. E.: Verpackung mit Kunststoffen [Packing with plastics], Carl Hanser Verlag, p. 271, 1997, ISBN 3-446-17711-6). When removing the film heatsealed to a test strip of the substrate in a tensile strain testing instrument at a peeling angle of 180° in accordance with FIG. 2, the tensile strain behavior of the film according to FIG. 3b is obtained. When peeling off the film from the substrate commences, the force required for this purpose rises, according to FIG. 3b, up to a certain value (e.g. 4 N/15 mm) and then remains approximately constant over the entire peeling process, but is subject to larger or smaller variations (approx. +/−20%)

DETAILED DESCRIPTION OF THE INVENTION

Figure 1:
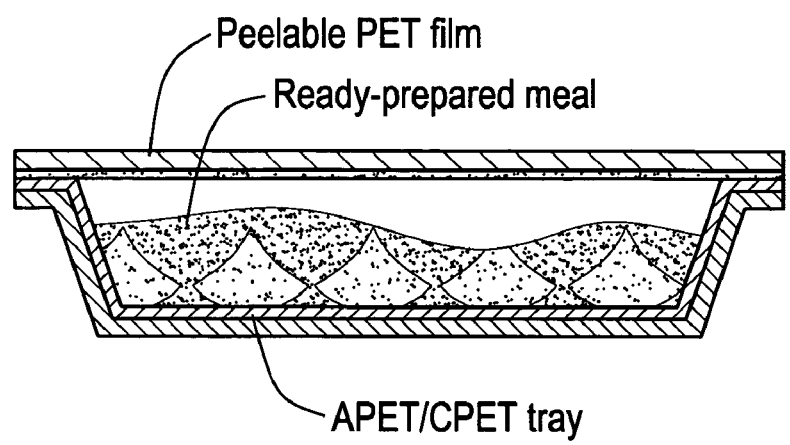
FIG. 1 is a schematic illustration of an exemplary sealed tray.

This object is achieved by providing a coextruded, transparent, biaxially oriented polyester film comprising a base layer (B) and a heatsealable top layer (A) which is peelable from at least APET, the heatsealable and peelable top layer (A) consisting of a) 80-98% by weight of polyester and
b) 2-10% by weight of inorganic and/or organic particles having an average diameter $d_{50}$ of from 2.0 to 8.0 µm (based on the mass of the top layer (A)), wherein c) the polyester being composed of 30-95 mol % of units which derive from at least one aromatic dicarboxylic acid and 5-70 mol % of units which derive from at least one aliphatic dicarboxylic acid, d) the ratio of particle size $d_{50}$ and layer thickness $d_A$ of the top layer (A) is greater than 1.3 and
e) the layer thickness of the top layer (A) $d_A$ is from 0.5 to 2.5 μm.

The material of the top layer (A) thus consists predominantly of a polyester and inorganic and/or organic particles. The polyester is composed of units which are derived from aromatic and aliphatic dicarboxylic acids. The units which derive from the aromatic dicarboxylic acids are present in the polyester in an amount of 30-95 mol %, preferably 50-90 mol %, more preferably 60-88 mol %. The units which derive from the aliphatic dicarboxylic acids are present in the polyester in an amount of 5-70 mol %, preferably 10-50 mol %, more preferably 12-40 mol %, and the molar percentages always add up to 100%. The diol units corresponding thereto likewise always make up 100 mol %.

Preferred aliphatic dicarboxylic acids are pimelic acid, suberic acid, azelaic acid, sebacic acid, glutaric acid and adipic acid. Particular preference is given to azelaic acid, sebacic acid and adipic acid.

Preferred aromatic dicarboxylic acids are terephthalic acid, isophthalic acid and 2,6-naphthalenedicarboxylic acid, in particular terephthalic acid and isophthalic acid.

Preferred diols are ethylene glycol, butylene glycol and neopentyl glycol.

In general, the polyester comprises the following dicarboxylates and alkylenes, based in each case on the total amount of dicarboxylate or total amount of alkylene:
from 30 to 45 mol %, preferably from 25 to 85 mol % and more preferably from 50 to 78 mol %, of terephthalate,
from 0 to 25 mol %, preferably from 5 to 20 mol % and more preferably from 10 to 20 mol %, of isophthalate,
from 5 to 70 mol %, preferably from 8 to 50 mol % and more preferably from 11 to 35 mol %, of azelate,
from 0 to 50 mol %, preferably from 0 to 40 mol % and more preferably from 0 to 30 mol %, of sebacate,
from 0 to 50 mol %, preferably from 0 to 40 mol % and more preferably from 0 to 30 mol %, of adipate,
more than 30 mol %, preferably more than 40 mol % and more preferably more than 50 mol %, of ethylene or butylene.

Up to 10% by weight of the material of the top layer (A) consists of additives, auxiliaries and/or other additives which are customarily used in polyester film technology.

It has been found to be appropriate to produce the main polyester of the top layer (A) from two separate polyesters I and II which are fed to the extruder for this layer as a mixture.

Figure 2:
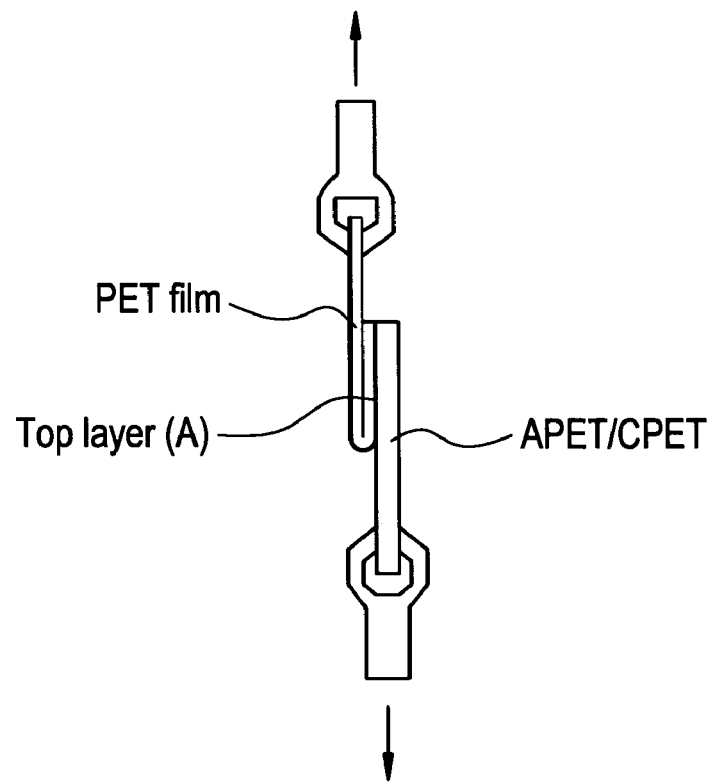
FIG. 2 is a schematic illustration of a tensile strain measuring technique.

The heatsealable and peelable top layer (A) is distinguished by characteristic features. It has a sealing commencement temperature (=minimum sealing temperature) with respect to the APET side of APET/CPET trays of not more than 150° C., preferably not more than 145° C. and more preferably not more than 140° C., and a seal seam strength with respect to the APET side of APET/CPET trays of at least 1 N, preferably at least 1.5 N, more preferably at least 2 N (always based on 15 mm film breadth). The heatsealable and peelable top layer (A), with respect to the APET side of APET/CPET trays, has a maximum sealing temperature of generally 220° C., preferably 200° C. and more preferably 190° C., and a film which is peelable with respect to the APET side of APET/CPET trays is obtained within the entire sealing range. In other words, this film in the 180° tensile experiment according to FIG. 2 provides a curve according to FIG. 3b.

The film of the present invention comprises a base layer (B) and at least one top layer (A) according to the invention.

In this case, the film has a two-layer structure. In a preferred embodiment, the film has a three- or more than three-layer structure. In the case of the particularly preferred three-layer embodiment, it consists of the base layer (B), the inventive top layer (A) and a top layer (C) on the opposite side to the top layer (A). In a four-layer embodiment, the film comprises an intermediate layer (D) between the base layer (B) and the top layer (A) or (C).

The base layer of the film consists of at least 80% by weight of thermoplastic polyester. Suitable for this purpose are polyesters of ethylene glycol and terephthalic acid (=polyethylene terephthalate, PET), of ethylene glycol and naphthalene-2,6-dicarboxylic acid (=polyethylene 2,6-naphthalate, PEN), of 1,4-bishydroxymethylcyclohexane and terephthalic acid (=poly-1,4-cyclohexanedimethylene terephthalate, PCDT) and also of ethylene glycol, naphthalene-2,6-dicarboxylic acid and biphenyl-4,4'-dicarboxylic acid (=polyethylene 2,6-naphthalate bibenzoate, PENBB). Preference is given to polyesters which contain ethylene units and consist, based on the dicarboxylate units, of at least 90 mol %, more preferably at least 95 mol %, of terephthalate or 2,6-naphthalate units. The remaining monomer units stem from other dicarboxylic acids or diols. Advantageously, copolymers or mixtures or blends of the homo- and/or copolymers mentioned can also be used for the base layer (B). (In the specification of the amounts of the dicarboxylic acids, the total amount of all dicarboxylic acids is 100 mol %. Similarly, the total amount of all diols also adds up to 100 mol %.)

Suitable other aromatic dicarboxylic acids are preferably benzenedicarboxylic acids, naphthalenedicarboxylic acids (for example naphthalene-1,4- or -1,6-dicarboxylic acid), biphenyl-x,x'-dicarboxylic acids (in particular biphenyl-4,4'-dicarboxylic acid), diphenylacetylene-x,x'-dicarboxylic acids (in particular diphenylacetylene-4,4'-dicarboxylic acid) or stilbene-x,x'-dicarboxylic acids. Of the cycloaliphatic dicarboxylic acids, mention should be made of cyclohexanedicarboxylic acids (in particular cyclohexane-1,4-dicarboxylic acid). Of the aliphatic dicarboxylic acids, the $(C_3-C_{19})$-alkanedioic acids are particularly suitable, and the alkane moiety may be straight-chain or branched.

Suitable other aliphatic diols are, for example, diethylene glycol, triethylene glycol, aliphatic glycols of the general formula HO—$(CH_2)_n$—OH where n is an integer from 3 to 6 (in particular propane-1,3-diol, butane-1,4-diol, pentane-1,5-diol and hexane-1,6-diol) or branched aliphatic glycols having up to 6 carbon atoms, cycloaliphatic, optionally heteroatom-containing diols having one or more rings. Of the cycloaliphatic diols, mention should be made of cyclohexanediols (in particular cyclohexane-1,4-diol).

Suitable other aromatic diols correspond, for example, to the formula HO—$C_6H_4$—X—$C_6H_4$—OH where X is —$CH_2$—, —$C(CH_3)_2$—, —$C(CF_3)_2$—, —O—, —S— or —$SO_2$—. In addition, bisphenols of the formula HO—$C_6H_4$—$C_6H_4$—OH are also very suitable.

It is particularly advantageous when a polyester copolymer based on terephthalate and small amounts (<5 mol %) of isophthalic acid or based on terephthalate and small amounts (<5 mol %) of naphthalene-2,6-dicarboxylic acid is used in the base layer (B). In this case, the producibility of the film and the optical properties of the film are particularly good. The base layer (B) then comprises substantially a polyester copolymer which is composed predominantly of terephthalic acid and isophthalic acid units and/or terephthalic acid and naphthalene-2,6-dicarboxylic acid units and of ethylene glycol units. The particularly preferred copolyesters which provide the desired properties of the film are those which are composed of terephthalate and isophthalate units and of ethylene glycol units.

The polyesters can be prepared by the transesterification process. In this process, the starting materials are dicarboxylic esters and diols which are reacted with the customary transesterification catalysts such as zinc, calcium, lithium and manganese salts. The intermediates are then polycondensed in the presence of generally customary polycondensation catalysts such as antimony trioxide, titanium oxides or esters, or else germanium compounds. The preparation may equally well be by the direct esterification process in the presence of polycondensation catalysts. This process starts directly from the dicarboxylic acids and the diols.

The film of the present invention has an at least two-layer structure. It then consists of the base layer (B) and the inventive sealable and peelable top layer (A) applied to it by coextrusion.

The sealable and peelable top layer (A) applied to the base layer (B) by coextrusion is composed predominantly, i.e. of at least approx. 80% by weight, of polyesters.

According to the invention, the heatsealable and peelable top layer (A) comprises polyesters based on aromatic and aliphatic acids and preferably aliphatic diols.

In the preferred embodiment, polyesters are copolyesters or mixtures of homo- and copolyesters or mixtures of different copolyesters whose composition is based on aromatic and aliphatic dicarboxylic acids and aliphatic diols.

Examples of the aromatic dicarboxylic acids which can be used in accordance with the invention are terephthalic acid, isophthalic acid, phthalic acid and 2,6-naphthalenedicarboxylic acid.

Examples of the aliphatic dicarboxylic acids which can be used in accordance with the invention are succinic acid, glutaric acid, adipic acid, pimelic acid, suberic acid, azelaic acid and sebacic acid.

Examples of the aliphatic diols which can be used in accordance with the invention are ethylene glycol, 1,3-propanediol, 1,3-butanediol, 1,4-butanediol, 1,5-pentanediol, 2,2-dimethyl-1,3-propanediol, diethylene glycol, triethylene glycol and 1,4-cyclohexanedimethanol.

The polyester for the top layer (A) is preferably prepared from two polyesters I and II.

The proportion of the polyester I which consists of one or more aromatic dicarboxylates and one or more aliphatic alkylenes in the top layer (A) is from 20 to 80% by weight. In the preferred embodiment, the proportion of the polyester I is from 25 to 75% by weight, and in the particularly preferred embodiment, it is from 30 to 70% by weight.

In general, the polyester I of the inventive top layer (A) is based on the following dicarboxylates and alkylenes, based in each case on the total amount of dicarboxylate or total amount of alkylene:
  from 70 to 100 mol %, preferably from 72 to 95 mol % and more preferably from 74 to 93 mol %, of terephthalate,
  from 0 to 30 mol %, preferably from 5 to 28 mol % and more preferably from 7 to 26 mol %, of isophthalate,
  more than 50 mol %, preferably more than 65 mol % and more preferably more than 80 mol %, of ethylene units.

Any remaining fractions present stem from other aromatic dicarboxylic acids and other aliphatic diols, as have already been listed above as main and secondary carboxylic acids of the base layer (B).

Very particular preference is given to those copolyesters in which the proportion of terephthalate units is from 74 to 88 mol %, the corresponding proportion of isophthalate units is from 12 to 26 mol % (the dicarboxylate fractions adding up to 100 mol %) and the proportion of ethylene units is 100 mol %. In other words, they are polyethylene terephthalate/isophthalate.

In a further preferred embodiment, the polyester I consists of a mixture which comprises a copolyester composed of terephthalate, isophthalate and of ethylene units, and an aromatic polyester homopolymer, e.g. a polybutylene terephthalate.

It has been found that in the case that the proportion of polyester I in the top layer (A) is less than 20% by weight, the producibility of the film by coextrusion technology is made distinctly more difficult, or is no longer guaranteed. The tendency of the film to adhere to certain machine parts, in particular to running metallic rolls in longitudinal stretching and after the transverse stretching, is particularly high in this case. In contrast, when the proportion of polyester I in the top layer (A) is on the other hand more than 80% by weight, the peeling performance of the film is strongly impaired. The sealing performance of the film changes in this case from peelable to weldable.

According to the present invention, the proportion of polyester II in the top layer (A) is from 20 to 75% by weight. In the preferred embodiment, the proportion of polyester II is from 25 to 70% by weight and in the particularly preferred embodiment, it is from 30 to 65% by weight.

The polyester II preferably consists of a copolymer of aliphatic and aromatic acid components, in which the aliphatic acid components are from 20 to 90 mol %, preferably from 30 to 70 mol % and more preferably from 35 to 60 mol %, based on the total acid amount of the polyester II. The remaining dicarboxylate content up to 100 mol % stems from aromatic acids, preferably of terephthalic acid and/or of isophthalic acid, and also, among the glycols, from aliphatic or cycloaliphatic or aromatic diols, as have already been described above with regard to the base layer.

In general, the polyester II of the inventive top layer (A) is based at least on the following dicarboxylates and alkylenes, based in each case on the total amount of dicarboxylate or the total amount of alkylene:
  from 20 to 65 mol %, preferably from 30 to 70 mol % and more preferably from 35 to 60 mol %, of azelate,
  from 0 to 50 mol %, preferably from 0 to 45 mol % and more preferably from 0 to 40 mol %, of sebacate,
  from 0 to 50 mol %, preferably from 0 to 45 mol % and more preferably from 0 to 40 mol %, of adipate,
  from 10 to 80 mol %, preferably from 20 to 70 mol % and more preferably from 30 to 60 mol %, of terephthalate,
  from 0 to 30 mol %, preferably from 3 to 25 mol % and more preferably from 5 to 20 mol %, of isophthalate,
  more than 30 mol %, preferably more than 40 mol % and more preferably more than 50 mol %, of ethylene or butylene.

Any remaining fractions present stem from other aromatic dicarboxylic acids and other aliphatic diols, as have already been listed above as main and secondary carboxylic acids for the base layer (B), or else from hydroxycarboxylic acids such as hydroxybenzoic acid or the like.

The presence of at least 10 mol % of aromatic dicarboxylic acid ensures that the polymer II can be processed without adhesion, for example in the coextruder or in the longitudinal stretching.

When the proportion of polyester II in the top layer (A) is less than 20% by weight, the peeling performance of the film is strongly impaired. In this case, the sealing performance of the film changes from peelable to weldable. In contrast, when the proportion of polyester II in the top layer (A) is on the other hand more than 75% by weight, the producibility of the film by coextrusion technology is made more difficult, or is no longer guaranteed. The tendency of the film to adhere to certain machine parts, in particular to running metallic rolls in longitudinal stretching and after the transverse stretching, is particularly high in this case.

The top layer (A) preferably comprises a mixture of the polyesters I and II. Compared to the use of only one polyester with comparable components and comparable proportions of the components, a mixture has the following advantages:

The mixture of the two polyesters I and II, from the aspect of the particular glass transition temperatures ($T_g$s), is easier to process (to extrude). As investigations have shown, the mixture of a polymer having a high $T_g$ (polyester I) and a polymer having a low $T_g$ (polyester II) has a lesser tendency to adhere in the coextruder than a single polymer having a correspondingly mixed $T_g$.

The polymer production is simpler, because the number of metering stations available for the starting materials generally cannot be unlimited.

Moreover, from a practical aspect, the desired peeling properties can be attained more individually with the mixture than when a single polyester is used.

The addition of particles (see below) is also simpler in the case of polyester I than in the case of polyester II.

Appropriately, the glass transition temperature of polyester I is more than 50° C. Preference is given to the glass transition temperature of polyester I being more than 55° C. and more preferably more than 60° C. When the glass transition temperature of polyester I is less than 50° C., the film cannot be produced in a reliable process. The tendency of the top layer (A) to adhere, for example to rolls, is so high that frequent film breaks, in particular in the longitudinal stretching, have to be expected. When this happens, the film can wind around the rolls in the longitudinal stretching, which can lead to considerable damage to the machine. In the extrusion, such a polyester adheres readily to the metallic walls and thus leads to blockages.

Appropriately, the glass transition temperature of polyester II is less than 20° C. The glass transition temperature is preferably less than 15° C. and more preferably less than 10° C. When the glass transition temperature of polyester II is greater than 20° C., the film has an increased tendency to start to tear or tear off when pulled from the tray, which is undesired.

According to the invention, the heatsealable and peelable top layer (A) comprises inorganic and/or organic particles (also referred to as "pigments" or "antiblocking agents") in a concentration of from 2 to 10% by weight, based on the mass of the top layer (A). In a preferred embodiment, the proportion of particles is from 3 to 9% by weight and in the particularly preferred embodiment it is from 4 to 8% by weight, likewise based on the mass of the top layer (A).

When the top layer (A) of the film comprises less than 2% by weight of particles, there is no positive influence on the removal performance (peeling performance) of the film from the tray; the film tends to start to tear or to tear off. In contrast, when the top layer (A) of the film comprises particles in a concentration of more than 10% by weight, the opacity of the film becomes too high.

It has been found to be advantageous when the particles are present in a certain size, in a certain distribution (this is then referred to as a particle system) and in a certain concentration. In addition, mixtures of two and more different particle systems and/or mixtures of particle systems having different chemical composition can be added to the top layer (A).

Customary particles are inorganic and/or organic particles, for example calcium carbonate, amorphous silica, talc, magnesium carbonate, barium carbonate, calcium sulfate, barium sulfate, lithium phosphate, calcium phosphate, magnesium phosphate, aluminum oxide, lithium fluoride, calcium, barium, zinc or manganese salts of the dicarboxylic acids used, carbon black, titanium dioxide, kaolin or the crosslinked polystyrene or acrylate particles. The particles can be added to the layer in the particular advantageous concentrations, for example as a glycolic dispersion during the polycondensation or via masterbatches in the course of the extrusion.

Particles which are preferred in accordance with the invention are synthetic, amorphous $SiO_2$ particles in colloidal form. These particles are bound into the polymer matrix in an outstanding manner and generate only a few vacuoles (cavities). Vacuoles form at the particles in the course of the biaxial orientation, generally cause opacity and are therefore little suited to the present invention. To (synthetically) produce the $SiO_2$ particles (also known as silica gel), sulfuric acid and sodium silicate are initially mixed together under controlled conditions to form hydrosol. This eventually forms a hard, transparent mass which is known as a hydrogel. After separation of the sodium sulfate formed as a by-product by a washing process, it can be dried and further processed. Control of the washing water pH and the drying conditions can be used to vary the important physical parameters, for example pore volume, pore size and the size of the surface of the resulting silica gel. The desired particle size (for example the $d_{50}$ value) and the desired particle size distribution (for example the SPAN98) are obtained by suitable grinding of the silica gel (for example mechanically or hydromechanically). Such particles can be obtained, for example, via Grace, Fuji, Degussa or Ineos.

According to the invention, the particles have an average particle diameter $d_{50}$ of from 2.0 to 8 µm, preferably from 2.5 to 7 µm and more preferably from 3.0 to 6 µm. When particles having a diameter which is below 2.0 µm are used, there is no positive influence of the particles on the removal performance of the film from the tray. In this case, the film again tends to start to tear or continue to tear on removal from the tray, which is undesired. Particles having a diameter greater than 8 µm generally cause filter problems.

According to the invention, the ratio of particle size $d_{50}$ and layer thickness $d_A$ of the top layer (A) in the heatsealable and peelable top layer (A) is greater than 1.3. Preference is given to the diameter/layer thickness ratio being at least 1.6 and more preferably at least 2.0. In these cases, there is a particularly positive influence of the particles on the removal performance of the film from the tray.

It has been found to be particularly advantageous to use particles in the heatsealable and peelable top layer (A) whose particle diameter distribution has a degree of scatter which is described by a SPAN98 of $\leq 2.0$ (definition of SPAN98, see measurement method). Preference is given to a SPAN98 of $\leq 1.9$ and particular preference to a SPAN98 of $\leq 1.8$. In contrast, when the top layer (A) of the film comprises particles whose SPAN98 is greater than 2.0, the optical properties and the sealing properties of the film deteriorate.

Moreover, it has been found to be advantageous to set the roughness of the heatsealable and peelable top layer (A) in such a way that its $R_a$ value is greater than 120 nm. Preference is given to the roughness $R_a$ being greater than 140 nm and it is more preferably greater than 160 nm. The upper limit of the roughness should not exceed 400 nm, preferably 350 nm, in particular 300 nm. This can be controlled via the selection of the particle diameters, their concentration and the variation of the layer thickness.

In order to further improve the processing performance of the film of the present invention, it is advantageous likewise to incorporate particles into the base layer (B) in the case of a two-layer film structure (AB), or into the nonsealable top layer (C) in the case of a three-layer film structure (ABC), in which case the following conditions should be observed:
a) The particles should have an average particle diameter $d_{50}$ (=median) of from 1.5 to 8 μm. It has been found to be particularly appropriate to use particles having an average particle diameter $d_{50}$ of from 2.0 to 5 μm and more preferably from 2.5 to 4 μm.
b) The particles should have a degree of scatter which is described by a SPAN98 of $\leq 2.0$. Preference is given to the SPAN98 being $\leq 1.9$ and particular preference to the SPAN98 being $\leq 1.8$.
c) The particles should be present in a concentration of from 0.1 to 0.5% by weight. The concentration of the particles is preferably from 0.12 to 0.4% by weight and more preferably from 0.15 to 0.3% by weight.

To achieve the aforementioned properties, in particular the optical properties of the sealable and peelable film, it has been found to be appropriate, in particular in the case of a three-layer film having ABC structure, to use a smaller amount of particles in the base layer (B) than in top layer (A). In the three-layer film of the type mentioned, the amount of particles in the base layer (B) should appropriately be between 0 and 2.0% by weight, preferably between 0 and 1.5% by weight, in particular between 0 and 1.0% by weight. It has been found to be particularly appropriate only to incorporate those particles into the base layer which get into the film via the same type of regrind (recyclate). The optical properties of the film, in particular the opacity of the film, are then particularly good.

Between the base layer and the top layers may optionally be disposed another intermediate layer. This may in turn consist of the polymers described for the base layer. In a particularly preferred embodiment, the intermediate layer consists of the polyesters used for the base layer. The intermediate layer may also comprise the customary additives described below. The thickness of the intermediate layer is generally greater than 0.3 μm and is preferably in the range from 0.5 to 15 μm, in particular in the range from 1.0 to 10 μm, more preferably in the range from 1.0 to 5 μm.

In the case of the two-layer and the particularly advantageous three-layer embodiment of the film according to the invention, the thickness of the top layer (A) is in the range from 0.5 and 2.5 μm, preferably in the range from 0.5 and 2.0 μm and more preferably in the range from 0.5 and 1.5 μm. When the thickness of the top layer (A) is more than 2.5 μm, the peeling force rises distinctly and is no longer within the inventive range. Moreover, the peeling performance of the film is impaired. In contrast, when the thickness of the top layer (A) is less than 0.5 mm, the film is no longer heat-sealable.

The thickness of the other, nonsealable top layer (C) may be the same as the top layer (A) or different; its thickness is generally between 0.5 and 5 μm.

The total thickness of the inventive polyester film may vary within certain limits. It is from 3 to 200 μm, in particular from 4 to 150 μm, preferably from 5 to 100 μm, and the layer (B) has a proportion of preferably from 45 to 97% of the total thickness.

The base layer and the other layers may additionally comprise customary additives such as stabilizers (UV, hydrolysis), flame-retardant substances or fillers. They are appropriately added to the polymer or the polymer mixture before the melting.

The present invention also provides a process for producing the film. To prepare the inventive heatsealable and peelable top layer (A), the particular polymers (polyester I, polyester II, optionally further polymers, for example masterbatch(es) for the particles) are appropriately fed directly to the extruder for the top layer (A). The materials can be extruded at from about 200 to 280° C. From a process engineering point of view (mixing of the different components), it has been found to be particularly advantageous when the extrusion of the polymers for the top layer (A) is carried out using a twin-screw extruder having degassing means.

The polymers for the base layer (B) and for the further top layer (C) which may possibly be present and optionally the intermediate layer are appropriately fed to the (coextrusion) system via further extruders. The melts are shaped to flat melt films in a multilayer die and layered on top of one another. Subsequently, the multilayer film is drawn off with the aid of a chill roll and optionally further rolls and solidified.

The biaxial stretching of the film is generally carried out sequentially. Simultaneous stretching of the film is also possible, but is not necessary. In the sequential stretching, preference is given to stretching first in longitudinal direction (i.e. in machine direction) and then in transverse direction (i.e. at right angles to machine direction). The stretching in the longitudinal direction can be carried out with the aid of two rolls rotating at different rates in accordance with the desired stretching ratio. For transverse stretching, an appropriate tenter frame is generally used.

The temperature at which the stretching is carried out can be varied within a relatively wide range and depends on the desired properties of the film. In general, the stretching is carried out in the longitudinal direction (machine direction orientation=MDO) in a temperature range of from 60 to 130° C. (heating temperatures from 60 to 130° C.), and in transverse direction (transverse direction orientation=TDO) in a temperature range from 90° C. (beginning of the stretching) to 140° C. (end of the stretching). The longitudinal stretching ratio is in the range from 2.0:1 to 5.5:1, preferably from 2.3:1 to 5.0:1. The transverse stretching ratio is generally in the range from 2.4:1 to 5.0:1, preferably from 2.6:1 to 4.5:1.

The preferred temperature range at which the biaxial stretching is carried out in the longitudinal stretching (MDO) is from 60 to 120° C. The heating temperatures of the film in the longitudinal stretching are in the range from 60 to 115° C. In the transverse stretching (TDO), the temperatures of the film are in the range from 90° C. (beginning of the stretching) to 140° C. (end of the stretching). The longitudinal stretching ratio in this preferred temperature range is in the range from 2.0:1 to 5.0:1, preferably from 2.3:1 to 4.8:1. The transverse stretching ratio is generally in the range from 2.4:1 to 5.0:1, preferably from 2.6:1 to 4.5:1.

The particularly preferred temperature range in which the biaxial stretching is carried out in the case of the longitudinal stretching (MDO) is from 60 to 110° C. The heating temperatures of the film in the longitudinal stretching are in the range from 60 to 105° C. In the transverse stretching (TDO), the temperatures of the film are in the range from 90° C. (beginning of the stretching) to 140° C. (end of the stretching). The longitudinal stretching ratio in this preferred temperature range is in the range from 2.0:1 to 4.8:1, preferably from 2.3:1 to 4.6:1. The transverse stretching ratio is generally in the range from 2.4:1 to 5.0:1, preferably from 2.6:1 to 4.5:1.

The preferred and especially the particularly preferred temperatures in the MDO particularly effectively take into account the adherent behavior of top layer (A) to rolls (metallic, ceramic or particularly coated roll surfaces).

Before the transverse stretching, one or more surface(s) of the film can be coated inline by the processes known per se. The inline coating may lead, for example, to improved adhesion between a metal layer or a printing ink and the film, to an improvement in the antistatic performance, in the processing performance or else to further improvement of barrier properties of the film. The latter is obtained, for example, by applying barrier coatings such as EVOH, PVOH or the like. In that case, preference is given to applying such layers to the nonsealable surface, for example the surface (C) of the film.

In the subsequent heat-setting, the film is kept at a temperature of from 150 to 250° C. over a period of from about 0.1 to 10 s. Subsequently, the film is wound up in a customary manner.

The gloss of the film surface (B) in the case of a two-layer film, or the gloss of the film surface (C) in the case of a three-layer film, is greater than 100 (measured to DIN 67530 based on ASTM-D 523-78 and ISO 2813 with angle of incidence 20°). In a preferred embodiment, the gloss of these sides is more than 110 and in a particularly preferred embodiment more than 120. These film surfaces are therefore suitable in particular for a further functional coating, for printing or for metallization.

The opacity of the film is less than 20. In a preferred embodiment, the opacity of the film is less than 16 and in a particularly preferred embodiment less than 12.

A further advantage of the invention is that the production costs of the film according to the invention are not substantially above those of a film made of standard polyester. In addition, it is guaranteed that, in the course of the production of the film, offcut material which arises intrinsically in the operation of the film production can be reused for the film production as regrind in an amount of up to 60% by weight, preferably from 5 to 50% by weight, based in each case on the total weight of the film, without the physical properties of the film being significantly adversely affected.

The film according to the invention is outstandingly suitable for packaging foods and other consumable goods, in particular for packaging foods and other consumable goods in trays in which peelable polyester films are used for opening the packaging.

The table which follows (table 1) once again summarizes the most important inventive film properties.

TABLE 1

|  | Inventive range | Preferred | Particularly preferred | Unit | Measurement method |
|---|---|---|---|---|---|
| Top layer (A) | | | | | |
| Proportion of units in the inventive polyester which are based on aromatic dicarboxylic acids | 30 to 95 | 50 to 90 | 60 to 88 | mol % | |
| Proportion of units in the inventive polyester which are based on aliphatic dicarboxylic acids | 5 to 70 | 10 to 50 | 12 to 40 | mol % | |
| Polyester I | 20 to 80 | 25 to 75 | 30 to 70 | % by wt. | |
| Polyester II | 20 to 75 | 25 to 70 | 30 to 65 | % by wt. | |
| Particle concentration | 2.0 to 10.0 | 3.0 to 9 | 4 to 8 | % | |
| Particle diameter $d_{50}$ | 2.0 to 8 | 2.5 to 7 | 3.0 to 6 | μm | |
| Thickness $d_A$ of the top layer A | 0.5 to 2.5 | 0.5 to 2.0 | 0.5 to 1.5 | μm | |
| Particle diameter/layer thickness ratio | >1.3 | ≧1.6 | ≧2.0 | | |
| Roughness Ra | >120 | >140 | >160 | nm | DIN 4768 |
| Properties | | | | | |
| Thickness of the film | 3 to 200 | 4 to 150 | 5 to 100 | μm | |
| Minimum sealing temperature of TL (A) with respect to APET/CPET trays | 150 | 145 | 140 | ° C. | |
| Seal seam strength of TL (A) with respect to APET/CPET trays | 1.0 to 4 | 1.5 to 4 | 2.0 to 4 | N/15 mm | |
| Gloss of the top layers A and C | >70 and >100 | >75 and >110 | >80 and >120 | | DIN 67530 |
| Opacity of the film | <20 | <16 | <12 | % | ASTM D 1003-52 |

TL: Top layer,
≧: greater than/equal to

To characterize the raw materials and the films, the following measurement methods were used for the purposes of the present invention:

Measurement of the Average Diameter $d_{50}$

The determination of the average diameter $d_{50}$ was carried out by means of a laser on a Malvern Master Sizer (Malvern Instruments Ltd., UK) by means of laser scanning (other measuring instruments are, for example, Horiba LA 500 or Sympathec Helos, which use the same measuring principle). To this end, the samples were introduced together with water into a cuvette and this is then placed in the measuring instrument. The dispersion is scanned by means of a laser and the signal is used to determine the particle size distribution by comparison with a calibration curve. The particle size distribution is characterized by two parameters, the median value $d_{50}$ (=measure of the position of the average value) and the degree of scatter, known as the SPAN98 (=measure of the scatter of the particle diameter). The measuring procedure is automatic and also includes the mathematical determination of the $d_{50}$ value. The $d_{50}$ value is determined by definition from the (relative) cumulative curve of the particle size distribution: the point at which the 50% ordinate value cuts the cumulative curve provides the desired $d_{50}$ value (also known as median) on the abscissa axis.

Measurement of SPAN98

The determination of the degree of scatter, the SPAN98, was carried out with the same measuring instrument as described above in the determination of the average diameter $d_{50}$. The SPAN98 is defined as follows:

$$SPAN98 = \frac{d_{98} - d_{10}}{d_{50}}$$

The basis of the determination of $d_{98}$ and $d_{10}$ is again the (relative) cumulative curve of the particle size distribution (see above "measurement of the average diameter $d_{50}$). The point at which the 98% ordinate value cuts the cumulative curve provides the desired $d_{98}$ value directly on the abscissa axis and the point at which the 10% ordinate value of the cumulative curve cuts the curve provides the desired $d_{10}$ value on the abscissa axis.

SV Value

The SV value of the polymer was determined by the measurement of the relative viscosity ($\eta_{rel}$) of a 1% solution in dichloroacetic acid in an Ubbelohde viscometer at 25° C. The SV value is defined as follows:

$$SV = (\eta_{rel} - 1) * 1000.$$

Glass Transition Temperatures $T_g$

The glass transition temperature $T_g$ was determined using film samples with the aid of DSC (differential scanning calorimetry). The instrument used was a Perkin-Elmer DSC 1090. The heating rate was 20 K/min and the sample weight approx. 12 mg. In order to eliminate the thermal history, the samples were initially preheated to 300° C., kept at this temperature for 5 minutes and then subsequently quenched with liquid nitrogen. The thermogram was used to find the temperature for the glass transition $T_g$ as the temperature at half of the step height.

Seal Seam Strength

To determine the seal seam strength, a film strip (100 mm long×15 mm wide) is placed on the APET side of an appropriate strip of the APET/CPET tray and sealed at the set temperature of ≈150° C., a sealing time of 0.5 s and a sealing pressure of 4 bar (sealing unit HSG/ET of Brugger, DE, sealing jaw heated on both sides). In accordance with FIG. 2, the sealed strips are clamped into the tensile testing machine (for example Zwick, DE) and the 180° seal seam strength, i.e. the force required to separate the test strips, was determined at a removal rate of 200 mm/min. The seal seam strength is quoted in N per 15 mm of film strip (e.g. 3 N/15 mm).

Determination of the Minimum Sealing Temperature

The Brugger HSG/ET sealing unit as described above for the measurement of the seal seam strength is used to produce heatsealed samples (seal seam 15 mm×100 mm), and the film is sealed at different temperatures with the aid of two heated sealing jaws at a sealing pressure of 4 bar and a sealing time of 0.5 s. The 180° seal seam strength was measured as for the determination of the seal seam strength. The minimum sealing temperature is the temperature at which a seal seam strength of at least 1.0 N/15 mm is attained.

Roughness

The roughness $R_a$ of the film was determined to DIN 4768 at a cutoff of 0.25 mm. It was not measured on a glass plate, but rather in a ring. In the ring method, the film is clamped into a ring, so that neither of the two surfaces touches a third surface (for example glass).

Opacity

The opacity according to Hölz was determined to ASTM-D 1003-52.

Gloss

The gloss of the film was determined to DIN 67530. The reflector value was measured as a characteristic optical parameter for the surface of a film. Based on the standards ASTM-D 523-78 and ISO 2813, the angle of incidence was set to 20°. A light beam hits the flat test surface at the angle of incidence set and is reflected or scattered by it. The lightbeams incident on the photoelectronic detector are displayed as a proportional electrical quantity. The measurement is dimensionless and has to be quoted together with the angle of incidence.

Tensile Strength

The tensile strength of the film was determined to DIN 53455. The extension rate is 1%/min; 23° C.; 50% relative humidity.

Modulus of Elasticity

The modulus of elasticity of the film was determined to DIN 53457. The extension rate is 1%/min; 23° C.; 50% relative humidity.

Shrinkage

The gloss of the film was determined to DIN 40634. The testing conditions are 150° C., 15 min.

The invention is illustrated hereinbelow with the aid of examples.

EXAMPLE 1

Chips of polyethylene terephthalate were fed to the extruder for the base layer (B). Chips of polyethylene terephthalate and particles were likewise fed to the extruder (twin-screw extruder) for the nonsealable top layer (C). In accordance with the process conditions listed in the table below, the raw materials were melted and homogenized in the two respective extruders.

In addition, a mixture consisting of polyester I, polyester II and $SiO_2$ particles was prepared for the heatsealable and peelable top layer (A). In table 2, the particular proportions of the dicarboxylic acids and glycols present in the two polyesters I and II in mol % and the particular proportions of the components present in the mixture in % by weight are specified. The mixture was fed to the twin-screw extruder with degassing for the sealable and peelable top layer (A). In accordance with the process conditions detailed in the table below, the raw materials were melted and homogenized in the twin-screw extruder.

By coextrusion in a three-layer die, the three melt streams were then layered on top of one another and ejected via the die lip. The resulting melt film was cooled and a transparent, three-layer film having ABC structure was subsequently produced in a total thickness of 25 μm by a stepwise orientation in the longitudinal and transverse direction. The thicknesses of the two top layers are each 1 μm (cf. also table 2).

Top layer (A), mixture of:
60% by weight of polyester I (=copolymer of 78 mol % of ethylene terephthalate, 22 mol % of ethylene isophthalate) having an SV value of 850. The glass transition temperature of polyester I is approx. 75° C. Polyester I additionally contains 5.0% by weight of ®Sylysia 430 (synthetic $SiO_2$, Fuji, Japan) having a particle diameter of $d_{50}=3.4$ µm and a SPAN98 of 1.7. The ratio of particle diameter $d_{50}$ to top layer thickness $d_{(A)}$ is 3.4:1 (cf. table 2).
40% by weight of polyester II (=copolymer containing 40 mol % of ethylene azelate, 50 mol % of ethylene terephthalate, 10 mol % of ethylene isophthalate) having an SV value of 1000. The glass transition temperature of polyester II is approx. 0° C.

Base layer (B):
100% by weight of polyethylene terephthalate having an SV value of 800

Top layer (C), mixture of:
85% by weight of polyethylene terephthalate having an SV value of 800
15% by weight of a masterbatch of 99% by weight of polyethylene terephthalate (SV value of 800) and 1.0% by weight of Sylobloc 44 H (synthetic $SiO_2$, Grace, Worms), $d_{50}=2.5$ µm, SPAN98=1.9

The production conditions in the individual process steps were:

| | | | |
|---|---|---|---|
| Extrusion | Temperatures | A layer: | 230° C. |
| | | B layer: | 280° C. |
| | | C layer: | 280° C. |
| | Temperature of the takeoff roll | | 20° C. |
| Longitudinal stretching | Heating temperature | | 70-100° C. |
| | Stretching temperature | | 105° C. |
| | Longitudinal stretching ratio | | 4 |
| Transverse stretching | Heating temperature | | 100° C. |
| | Stretching temperature | | 135° C. |
| | Transverse stretching ratio | | 4 |
| Setting | Temperature | | 230° C. |
| | Time | | 3 s |

Table 3 shows the properties of the film. According to measurements (column 2), the minimum sealing temperature of the film with respect to the APET side of APET/CPET trays is 140° C. The film was sealed to the APET side of APET/CPET trays at 140, 160, 180 and 200° C. (sealing pressure 4 bar, sealing time 0.5 s). Subsequently, strips of the bond of inventive film and APET/CPET tray were pulled apart by means of a tensile strain tester in accordance with the aforementioned measurement method (cf. FIG. 2). For all sealing temperatures, the films exhibited the desired peeling off from the tray according to FIG. 3b. The seal seam strengths measured are listed in column 2. For all sealing temperatures, peelable films were obtained. The seal seam strengths are within the lower range, i.e. the films can be removed from the tray without any force being applied (=easy peel). In addition, the film had the required good optical properties, exhibited the required handling and the good processing performance.

EXAMPLE 2

In comparison to example 1, the top layer thickness of the sealable layer (A) was raised from 1.0 to 1.5 µm with otherwise identical film structure and otherwise identical production method. The minimum sealing temperature of the film with respect to the APET side of APET/CPET trays is now 140° C. For all sealing temperatures, the films exhibited the desired peeling off from the tray according to FIG. 3b. The seal seam strengths measured are listed in column 3. For all sealing temperatures, peelable films were again obtained. The seal seam strengths of the inventive films are somewhat higher than in example 1. However, they are still within the lower range, so that the film can be removed from the tray without any force being applied. A somewhat lower opacity of the film was measured; the handling and the processing performance of the film were as in example 1.

EXAMPLE 3

In comparison to example 1, the composition of the mixture for the sealable top layer (A) was changed with otherwise identical film structure. The composition of the individual components remained unchanged in comparison to example 1. The mixture now consists of the following raw material proportions:

| | |
|---|---|
| polyester I = | 40% by weight, |
| polyester II = | 60% by weight |

As a consequence of the higher proportion of polyester II in the mixture, the process parameters were modified in the longitudinal stretching. The new conditions for longitudinal stretching are listed in the table below:

| | | |
|---|---|---|
| Longitudinal stretching | Heating temperature | 70-95° C. |
| | Stretching temperature | 100° C. |
| | Longitudinal stretching ratio | 3.8 |

The minimum sealing temperature of the film with respect to the APET side of APET/CPET trays is now 138° C. For all sealing temperatures, the films exhibited the desired peeling off from the tray according to FIG. 3b. The seal seam strengths measured are listed in column 3. For all sealing temperatures, peelable films were again obtained. The seal seam strengths of the films according to the invention are somewhat higher than in example 1. They are within the medium range, so that the film can be removed from the tray without substantial force being applied. The handling and the processing performance of the film were as in example 1.

EXAMPLE 4

In comparison to example 3, the composition of polyester II for the sealable top layer (A) was changed with otherwise identical film structure. The composition of the individual components in the mixture remained unchanged in comparison to example 3. The mixture used in top layer (A) now consists of the following raw material proportions:
40% by weight of polyester I, identical to example 1
60% by weight of polyester II, VITEl® 1912, (polyester, Bostik-Findley, USA; contains the dicarboxylic acid constituents azelaic acid, sebacic acid, terephthalic acid, isophthalic acid and further dicarboxylic acids approximately in the molar ratio 40/1/45/10/4, and, as the diol component, at least 60 mol % of ethylene glycol). The glass transition temperature of polyester II is approx. −1° C.

The process parameters in the longitudinal stretching corresponded to those in example 5. The minimum sealing temperature of the film produced in accordance with the invention to the APET side of APET/CPET trays is now 138° C.

Figure 3A:
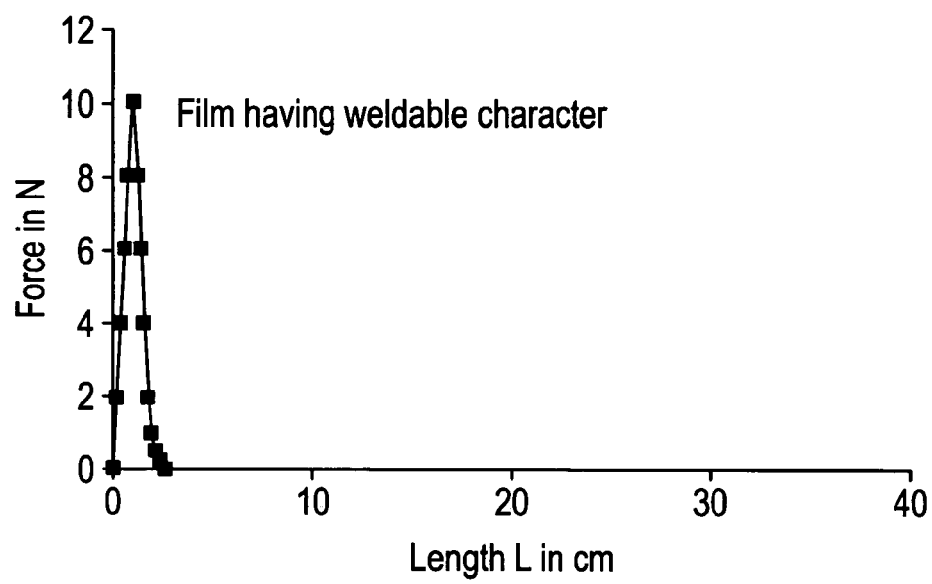
FIG. 3a is an exemplary diagram of tensile strain at break for a film having weldable behavior.
Figure 3B:
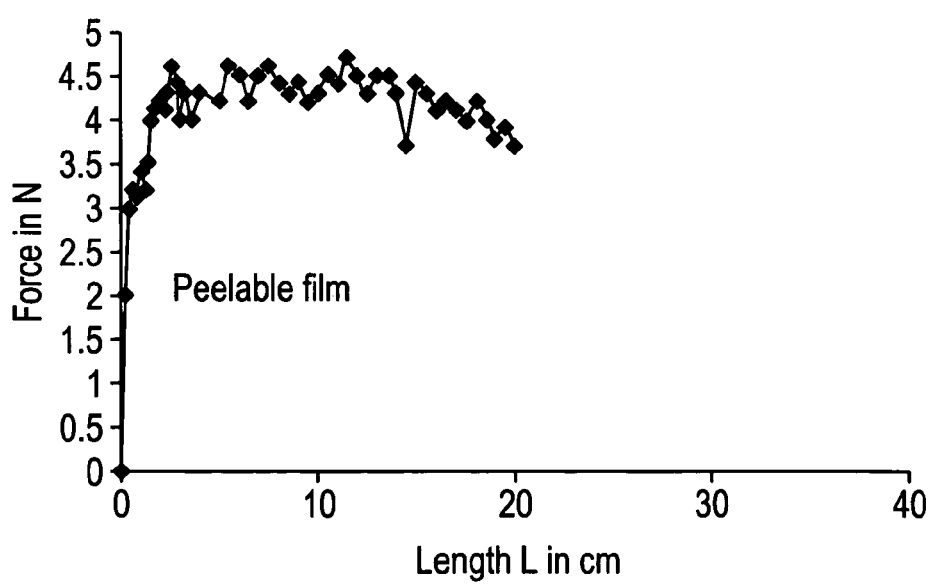
FIG. 3b is an exemplary diagram of tensile strain at break for a film having peelable behavior.
Figure 4:
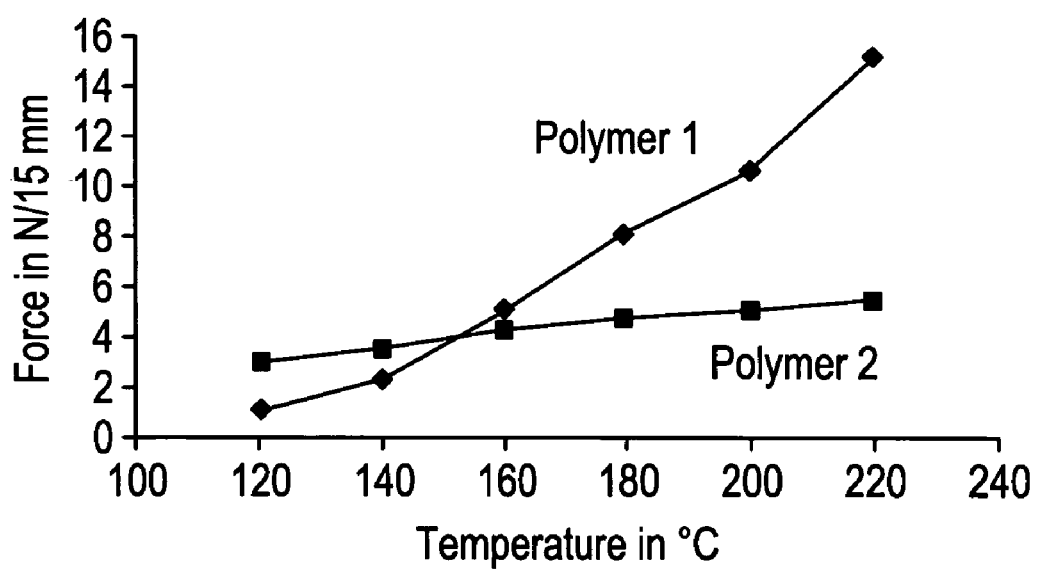
FIG. 4 is an exemplary diagram of tensile strain at break for a film having weldable and peelable behavior.

For all sealing temperatures, the films exhibited the desired peeling off from the tray according to FIG. 3b. The seal seam strengths measured are listed in column 3. For all sealing temperatures, peelable films were again obtained. The seal seam strengths of the inventive films are higher than in example 1. They are within the medium range, so that the film can be removed from the tray without substantial force being applied. The handling and the processing performance of the film were as in example 1.

COMPARATIVE EXAMPLE 1

In comparison to example 1, the composition of the sealable layer (A) was changed. In the top layer (A), only the polyester I based on aromatic acids was used:

100% by weight of polyester I (=copolymer of 78 mol % of ethylene terephthalate and 22 mol % of ethylene isophthalate) having an SV value of 850. The glass transition temperature of polyester I is approx. 75° C. In addition, polyester I contains 5.0% of ®Sylysia 430

The production conditions in the individual process stages were adapted in the longitudinal stretching to the glass transition temperature of the top layer raw material:

| Longitudinal stretching | Heating temperature | 70-115° C. |
|---|---|---|
| | Stretching temperature | 120° C. |
| | Longitudinal stretching ratio | 4 |

Table 3 shows the properties of the film. Although the film is highly pigmented and the pigments constitute weak points in the sealing layer, a peelable film was not obtained for any of the specified sealing temperatures. On removal of the film from the tray, the film started to tear immediately and exhibited a diagram according to FIG. 3a. The film exhibited weldable behavior and is thus unsuitable for the achievement of the object specified.

COMPARATIVE EXAMPLE 2

Example 5 from EP-A-0 035 835 was reproduced. Table 3 shows the properties of the film. A peelable film was not obtained for any of the specified sealing temperatures. On removal of the film from the tray, the film started to tear immediately and exhibited a diagram according to FIG. 3a. The film exhibited weldable behavior and is thus unsuitable for the achievement of the object specified.

COMPARATIVE EXAMPLE 3

Example 1 from EP-A-0 379 190 was reproduced. Table 3 shows the properties of the film. A peelable film was not obtained for any of the specified sealing temperatures. On removal of the film from the tray, the film started to tear immediately and exhibited a diagram according to FIG. 3a. The film exhibited weldable behavior and is thus unsuitable for the achievement of the object specified.

COMPARATIVE EXAMPLE 4

Example 22 from EP-A-0 379 190 was reproduced. Table 3 shows the properties of the film. A peelable film was not obtained for any of the specified sealing temperatures. On removal of the film from the tray, the film started to tear immediately and exhibited a diagram according to FIG. 3a. The film exhibited weldable behavior and is thus unsuitable for the achievement of the object specified.

TABLE 2

| | Polyester I composition | | | | Polyester II composition | | | | | | | | PI/PII/ polymer ratios |
|---|---|---|---|---|---|---|---|---|---|---|---|---|---|
| | TA | IA | EG | NG | AzA | SeA | AdA | TA | IA | EG | BD | FA | |
| | mol % | | | | mol % | | | | | | | | % by wt |
| Examples | | | | | | | | | | | | | |
| 1 | 78 | 22 | 100 | | 40 | | | 50 | 10 | 100 | | | 60/40 |
| 2 | 78 | 22 | 100 | | 40 | | | 50 | 10 | 100 | | | 60/40 |
| 3 | 78 | 22 | 100 | | 40 | | | 50 | 10 | 100 | | | 40/60 |
| 4 | 78 | 22 | 100 | | 40 | 1 | | 45 | 10 | >60 | 4 | | 40/60 |
| C Examples | | | | | | | | | | | | | |
| 1 | 78 | 22 | 100 | — | — | — | — | — | — | — | — | — | 100/0 |
| 2 | 82 | 18 | 100 | — | — | — | — | — | — | — | — | — | 100/0 |
| 3 | — | — | — | | 10 | | 90 | | | 100 | | | 0/100 |
| 4 | 100 | — | 84.6 | 15.4 | — | 31.5 | 2.4 | 65 | 1.1 | 95.4 | 4.6 | | 50/50 |

TABLE 2-continued

| | Glass transition temperatures PI/PII polymer °C. | Film structure | Film thickness μm | Top layer thicknesses (A) μm | (C) μm | Particles in top layer (A) Diameter μm | SPAN 98 — | Conc % | $d_{50}/d_{(A)}$ ratio |
|---|---|---|---|---|---|---|---|---|---|
| Examples | | | | | | | | | |
| 1 | 75/0 | ABC | 25 | 1 | 1 | 3.4 | 1.8 | 3.00 | 3.4 |
| 2 | 75/0 | ABC | 25 | 1.5 | 1 | 3.4 | 1.8 | 2.75 | 2.27 |
| 3 | 75/0 | ABC | 25 | 1.5 | 1 | 3.4 | 1.8 | 2.00 | 2.27 |
| 4 | 75/−1 | ABC | 25 | 1 | 1 | 3.4 | 1.8 | 1.50 | 3.4 |
| C Examples | | | | | | | | | |
| 1 | 75 | ABC | 25 | 1 | 1 | 3.4 | 1.8 | 5 | 3.4 |
| 2 | 75 | AB | 20 | 2.98 | — | 1.5 + 5 | — | 0.3 | 1.68 |
| 3 | approx. 50 | AB | 17.2 | 4.1 | — | — | — | — | — |
| 4 | approx. 20 | AB | 11.5 | 2.5 | — | 2 | — | 0.25 | 0.8 |

TA terephthalate,
IA isophthalate,
EG ethylene,
BD butane,
NG neopentyl
AzA azelate,
SeA sebacate,
AdA adipate,
FA further dicarboxylic acids and glycols

TABLE 3

| | Minimum sealing temperature °C. | Seal seam strength with respect to APET/CPET trays | | | | Peeling test (=peeling performance) | Opacity % | Gloss | | Roughnesses | |
|---|---|---|---|---|---|---|---|---|---|---|---|
| | | 140° C. | 160° C. | 180° C. | 200° C. | | | A side | C side | A side | C side |
| | | N/15 mm | | | | | | | | μm | |
| Examples | | | | | | | | | | | |
| 1 | 140 | 2.5 | 2.6 | 2.9 | 3.1 | ++++ | 17 | 75 | 130 | 259 | 60 |
| 2 | 140 | 3.2 | 3.1 | 3.4 | 3.5 | ++++ | 12 | 80 | 130 | 278 | 60 |
| 3 | 138 | 3.4 | 3.2 | 3.5 | 3.9 | ++++ | 17 | 72 | 130 | 224 | 60 |
| 4 | 138 | 3.2 | 3.4 | 3.5 | 3.6 | ++++ | 14 | 85 | 130 | 212 | 60 |
| C Examples | | | | | | | | | | | |
| 1 | 105 | 1.7 | 3.5 | 5 | 8 | − | 23 | 55 | 130 | 310 | 60 |
| 2 | 109 | 2 | 4.2 | 5.5 | 8.1 | − | 13 | 110 | 190 | 69 | 25 |
| 3 | 112 | 1.5 | 2 | 4 | 6 | − | 4 | 150 | 190 | 33 | 20 |
| 4 | 110 | 2 | 3 | 4 | 5 | − | 1.5 | 130 | 190 | 120 | 22 |

Peeling test:
++++ At all sealing temperatures, film is peeled from the tray without the film starting to tear or continuing to tear. Impeccable, smooth, clean peeling of the film from the tray, even in the upper temperature range at high seal seam strength.
− At all sealing temperatures, film starts to tear on removal from the tray.

What is claimed is:

1. A coextruded, transparent, biaxially oriented polyester film comprising a base layer (B) and a heatsealable top layer (A) which is peelable from at least APET, the heatsealable and peelable top layer (A) consisting of
   a) about 80-98% by weight of polyester and
   b) about 2-10% by weight of inorganic and/or organic particles having an average diameter $d_{50}$ of from about 2.0 to 8.0 μm, based on the mass of the top layer (A), wherein
   c) the polyester comprises about 30-95 mol % of units derived from at least one aromatic dicarboxylic acid and about 5-70 mol % of units derived from at least one aliphatic dicarboxylic acid,
   d) the ratio of particle size $d_{50}$ and layer thickness $d_A$ of the top layer (A) is greater than about 1.3 and
   e) the layer thickness of the top layer (A) $d_A$ is from about 0.5 to 2.5 μm.

2. The coextruded, sealable and peelable polyester film as claimed in claim 1, wherein the aliphatic dicarboxylic acids are selected from the group consisting of pimelic acid, suberic acid, azelaic acid, sebacic acid, glutaric acid, adipic acid and mixtures thereof.

3. The coextruded, sealable and peelable polyester film as claimed in claim 1, wherein the aromatic dicarboxylic acids are selected from the group consisting of terephthalic acid, isophthalic acid, 2,6-naphthalenedicarboxylic acid and mixtures thereof.

4. The coextruded, sealable and peelable polyester film as claimed in claim 1, wherein the polyester of the top layer (A) comprises:
from about 30 to 95 mol % of terephthalate,
from about 0 to 25 mol % of isophthalate,
from about 5 to 70 mol % of azelate,
from about 0 to 50 mol % of sebacate,
from about 0 to 50 mol % of adipate and
more than about 30 mol % of ethylene,
based in each case on the total amount of dicarboxylate or the total amount of alkylene.

5. The coextruded, sealable and peelable polyester film as claimed in claim 1, wherein the heatsealable and peelable top layer (A) has a sealing commencement temperature or minimum sealing temperature with respect to the APET side of APET/CPET trays of not more than about 150° C.

6. The coextruded, sealable and peelable polyester film as claimed in claim 1, wherein the heatsealable and peelable top layer (A) has a seal seam strength with respect to the APET side of APET/CPET trays of at least about 1.0 N/15 mm.

7. The coextruded, sealable and peelable polyester film as claimed in claim 1, wherein the heatsealable and peelable top layer (A) with respect to the APET side of APET/CPET trays has a maximum sealing temperature of about 220° C.

8. The coextruded, sealable and peelable polyester film as claimed in claim 1, wherein the polyester for the top layer (A) is produced from two polyesters I and II.

9. The coextruded, sealable and peelable polyester film as claimed in claim 8, wherein the proportion of the polyester I in the top layer (A) is from about 20 to 80% by weight.

10. The coextruded, sealable and peelable polyester film as claimed in claim 9, wherein the polyester I consists of one or more aromatic dicarboxylates and one or more aliphatic alkylenes.

11. The coextruded, sealable and peelable polyester film as claimed in claim 8, wherein the proportion of polyester II in the top layer (A) is from about 20 to 70% by weight.

12. The coextruded, sealable and peelable polyester film as claimed in claim 11, wherein the polyester II consists of one or more aromatic dicarboxylates and also one or more aliphatic dicarboxylates and one or more aliphatic alkylenes.

13. The coextruded, sealable and peelable polyester film as claimed in claim 8, wherein the glass transition temperature of polyester I is more than about 50° C.

14. The coextruded, sealable and peelable polyester film as claimed in claim 8, wherein the glass transition temperature of polyester II is less than about 20° C.

15. The coextruded, sealable and peelable polyester film as claimed in claim 1, wherein the distribution of the particle diameters of the particles has a degree of scatter which is described by a SPAN98 of ≦about 2.0.

16. The coextruded, sealable and peelable polyester film as claimed in claim 1, wherein the film has two layers and an AB structure.

17. The coextruded, sealable and peelable polyester film as claimed in claim 1, wherein the film has three layers and an ABC structure.

18. A lid film for covering APET/CPET trays comprising the coextruded, sealable and peelable polyester film as claimed in claim 1.

19. The sealable and peelable polyester film as claimed in claim 1, wherein the heatsealable top layer (A) exhibits a gloss of greater than 70, bases on ASTM-D 523-78 using an angle of incidence of 20°.

20. The sealable and peelable polyester film as claimed in claim 1, wherein the ratio of particle size $d_{50}$ and layer thickness $d_A$ of the top layer (A) is greater than about 2.0.

* * * * *

UNITED STATES PATENT AND TRADEMARK OFFICE
CERTIFICATE OF CORRECTION

PATENT NO. : 7,288,312 B2  Page 1 of 1
APPLICATION NO. : 10/953664
DATED : October 30, 2007
INVENTOR(S) : Peiffer et al.

It is certified that error appears in the above-identified patent and that said Letters Patent is hereby corrected as shown below:

Claims

Column 26
Claim 19, Line 27, insert --coextruded-- before "sealable"
Claim 20, Line 31, insert --coextruded-- before "sealable"

Signed and Sealed this

Twenty-fifth Day of December, 2007

JON W. DUDAS
*Director of the United States Patent and Trademark Office*